(12) United States Patent
Thomas

(10) Patent No.: US 7,878,577 B2
(45) Date of Patent: Feb. 1, 2011

(54) REAR AIR GUIDING DEVICE FOR A MOTOR VEHICLE

(75) Inventor: Peter Thomas, Schellbronn (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 23 days.

(21) Appl. No.: 12/472,411

(22) Filed: May 27, 2009

(65) Prior Publication Data

US 2010/0026045 A1 Feb. 4, 2010

(30) Foreign Application Priority Data

Aug. 4, 2008 (DE) ........................ 10 2008 036 283

(51) Int. Cl.
*B60J 5/10* (2006.01)
(52) U.S. Cl. ................................ 296/180.1; 296/180.2
(58) Field of Classification Search ............. 296/180.1, 296/180.2, 146.8, 56
See application file for complete search history.

(56) References Cited

U.S. PATENT DOCUMENTS

| 5,360,253 | A | * | 11/1994 | Sasaki et al. | ............. | 296/180.1 |
| 5,435,617 | A | * | 7/1995 | Stanesic | ................... | 296/180.1 |
| 2009/0001757 | A1 | * | 1/2009 | Terakawa et al. | ........ | 296/180.1 |

* cited by examiner

*Primary Examiner*—Joseph D Pape

(57) ABSTRACT

A rear air guiding device is disposed in a region of a roof rear edge on a tailgate provided with a rear window. An upper approach flow surface of the air guiding device forms an extension of the roof upper side mounted in front thereof, and the air guiding device protrudes over an upper border region of the rear window. In order to reduce the outlay on components and installation and also the weight of the air guiding device, it is provided that the latter is composed of a front part which is integrated in the tailgate and of a rear part which adjoins the front part such that their outer skins are flush and is connected to the front part.

21 Claims, 10 Drawing Sheets

REAR AIR GUIDING DEVICE FOR A MOTOR VEHICLE

CROSS-REFERENCE TO RELATED APPLICATION

This application claims the priority, under 35 U.S.C. §119, of German application DE 10 2008 036 283.2, filed Aug. 4, 2008; the prior application is herewith incorporated by reference in its entirety.

BACKGROUND OF THE INVENTION

Field of the Invention

The invention relates to a rear air guiding device for a motor vehicle, the air guiding device being arranged in a region of a roof rear edge on a tailgate provided with a rear window. An upper approach flow surface of the air guiding device forms an extension of the roof upper side mounted in front thereof, and the air guiding device protrudes over an upper border region of the rear window.

In the case of a full back motor vehicle (for example a BMW X5), it is known to arrange a rear air guiding device, which is generally referred to as a roof spoiler, in the region of the roof rear edge above the rear window, as a result of which the rear separation edge of the air flow is shifted to the rear and therefore the wake behind the vehicle is reduced.

An air guiding device of this type is formed by a relatively large plastic component which has a considerable weight, is placed onto the outer side of the outer sheet of the tailgate after the vehicle has been painted and is held in position on the outer sheet via fastening elements. In order to ensure functionally correct fastening of the relatively large, heavy air guiding device and a uniform gap between the air guiding device and the adjacent body, a high outlay on installation and fastening which is intensive in terms of time and costs is required.

SUMMARY OF THE INVENTION

It is accordingly an object of the invention to provide a rear air guiding device for a motor vehicle which overcomes the above-mentioned disadvantages of the heretofore-known devices of this general type, which is formed in such a manner that the outlay on components and installation is reduced and weight is also reduced.

With the foregoing and other objects in view there is provided, in accordance with the invention, a rear air guiding device for a motor vehicle. The air guiding device is disposed in a region of a roof rear edge on an upper border region of a tailgate provided with a rear window. The rear air guiding device contains a front part integrated in the tailgate and has an outer skin. The front part further has an upper approach flow surface forming an extension of a roof upper side mounted in front of the upper approach flow surface. The air guiding device protrudes over an upper border of the rear window. A rear part adjoins the front part and has an outer skin flush with the outer skin of the front part. The rear part is connected to the front part.

The air guiding device which contains a front part which is integrated in the tailgate and a rear part which adjoins the front part such that their outer skins are flush and is connected to the front part has a significantly lower weight and can be fastened to the vehicle in a substantially shorter time than conventional air guiding devices. A positional adjustment is unnecessary. The front part of the air guiding device, which front part has a relatively long length—as seen in the longitudinal direction of the vehicle—and is integrated in the tailgate, forms, as it were, a stable supporting structure for the relatively short, lightweight rear part of the air guiding device. A transversely running retaining strip adjusted on the rear border of the front part by use of centering pins ensures that the rear part can be automatically connected in a simple manner and in a correct position to the front part. Wedge-shaped tongues on the retaining strip ensure, during the installation, that the rear part of the air guiding device automatically takes up its correct position in the Y direction (transverse direction of the vehicle). In the Z direction (vertical direction of the vehicle), the rear part of the air guiding device is adjusted by locally provided contact surfaces on supporting ribs of the retaining strip. In the X direction (longitudinal direction of the vehicle), the rear part of the air guiding device is fixed by the latching between the retaining strip and the rear part.

The rear part, which contains an inner support part and an outer part, has locally a receptacle for a high-mounted brake light. Furthermore, an AM antenna is integrated in the rear part of the air guiding device. A transversely running separation edge for the air flow flowing away over the vehicle roof is formed in some regions of the rear, upper border of the rear part of the air guiding device.

The two-part concept of the air guiding device enables the latter to be formed in two colors, for example the front part to be formed in the color of the vehicle and the rear part in a contrasting color. Furthermore, the concept affords the possibility of combining the body-side front part with differently configured rear parts such that visually different air guiding devices can be generated, for example for special models of a specific vehicle series, with very little outlay.

Other features which are considered as characteristic for the invention are set forth in the appended claims.

Although the invention is illustrated and described herein as embodied in a rear air guiding device for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
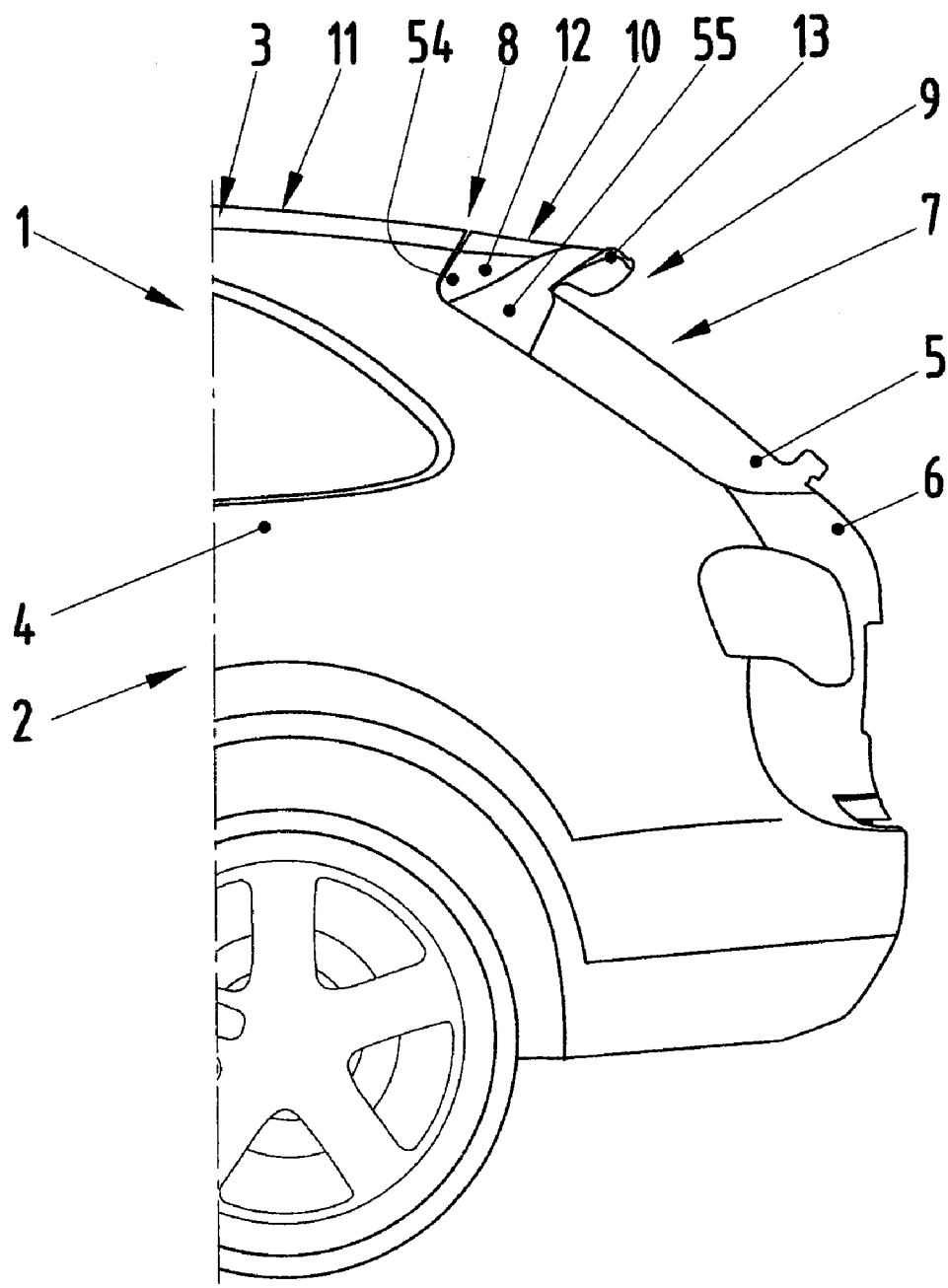
FIG. 1 is a diagrammatic, partial side view of a rear region of a motor vehicle with a rear air guiding device arranged in a region of a roof rear edge according to the invention.
Figure 2:
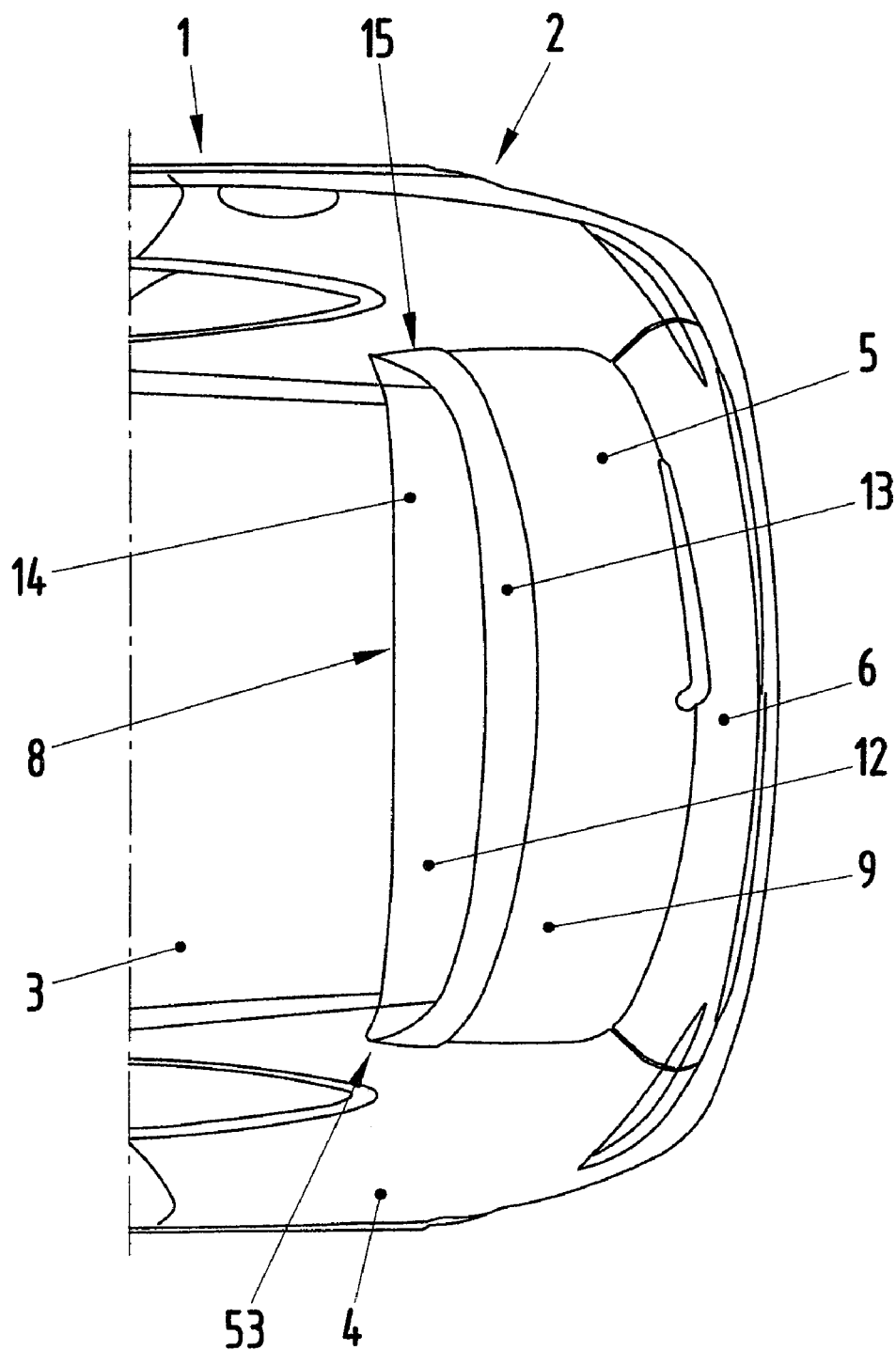
FIG. 2 is a diagrammatic, partial top view corresponding to FIG. 1.

Referring now to the figures of the drawing in detail and first, particularly, to FIG. 1 thereof, there is shown a motor vehicle 1 formed by a passenger vehicle and has a body 2 which, in the region illustrated, is composed of a roof 3, rear side parts 4 and a rear window 5. In the exemplary embodiment, the rear window 5 is assigned to a tailgate 6, the upper border of which is coupled to the adjacent body 2 by non-illustrated hinges. The motor vehicle 1 illustrated in FIG. 1 has a full back 7, i.e. the back is inclined at an angle α of greater than 30° in relation to a horizontal plane.

Figure 7:
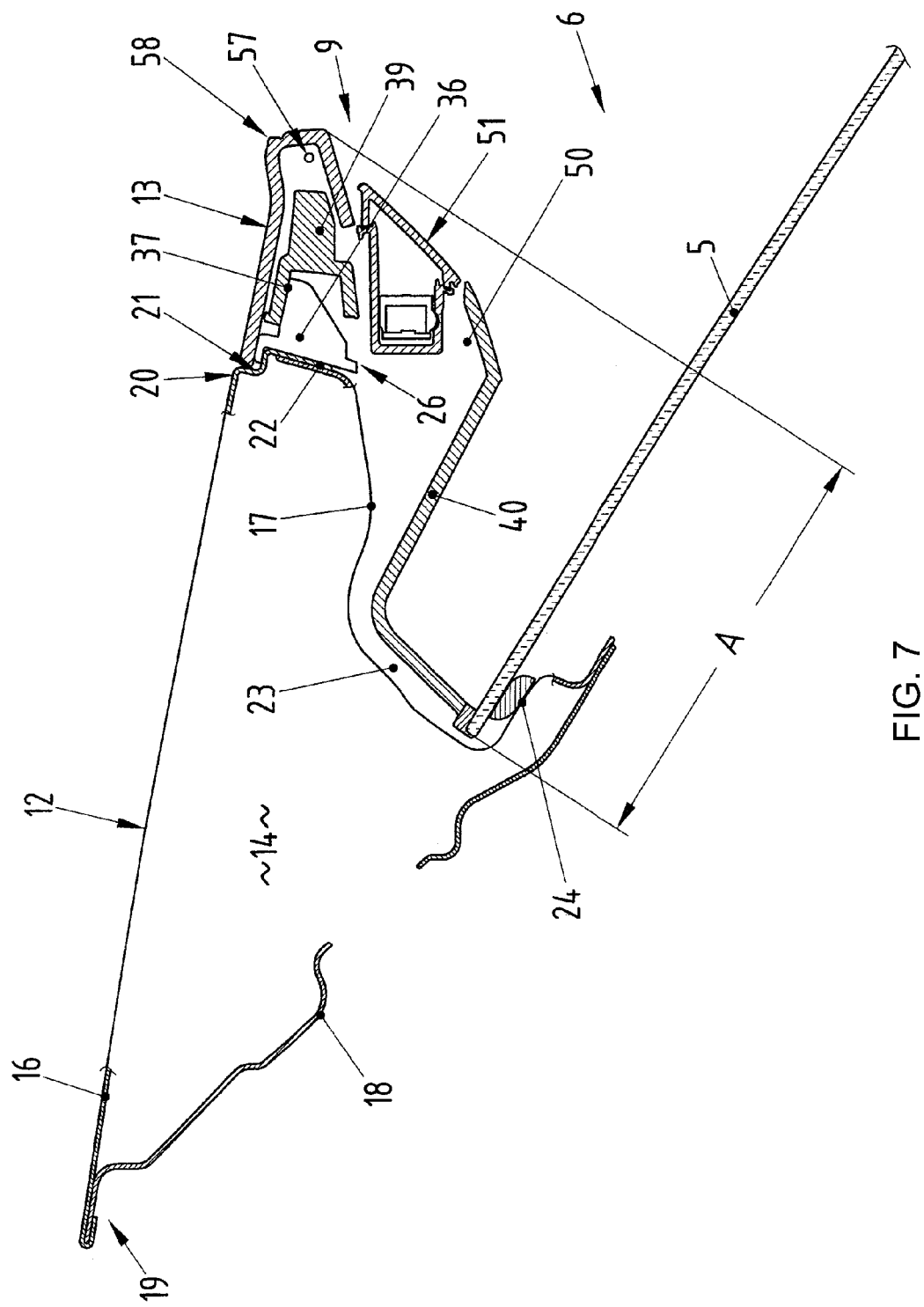
FIG. 7 is a diagrammatic, sectional view taken along the line VII-VII shown in FIG. 6 in an enlarged illustration.

In the region of a roof rear edge 8, a rear air guiding device 9, which is generally referred to as a roof spoiler, is arranged in an upper border region of the tailgate 6, wherein an upper approach flow surface 10 of the air guiding device 9 forms an imaginary extension of a roof upper side 11 mounted in front thereof (FIG. 1). By the rear air guiding device 9 in the region of the roof rear edge 8, a rear separation edge of the air flow guided over the roof 3 is displaced further to the rear and therefore the wake behind the motor vehicle is reduced. The air guiding device 9 protrudes over an upper border region of the rear window 5 and by an extent A and therefore upwardly covers the rear window 5 in the region (FIG. 7).

The rear air guiding device 9 is composed according to the invention of a front part 12 which is integrated in the tailgate 6 and a rear part 13 which adjoins the front part 12 such that their outer skins are flush and is connected to the latter. In this case, the rear part 13 has, as seen in the longitudinal direction of the vehicle, a substantially shorter longitudinal extent than the front part 12. In the exemplary embodiment, the front part 12 and the rear part 13 are produced from different materials. In addition, the two parts 12, 13 can be configured to differ in color. In the exemplary embodiment, the front part 12 is preferably manufactured from aluminum sheets for weight reasons whereas the rear part 13 is produced from a suitable plastic. Whereas, in the exemplary embodiment, the front part 12 is painted in the color of the vehicle, the rear part 13 is configured in a different color. Of course, the front part 12 may also be manufactured from steel sheet, plastic or the like.

In the case of the arrangement according to the invention, the front part 12 of the air guiding device 9 forms, as it were, a stable supporting structure for the relatively short and lightweight rear part 13. In order to reduce the outlay on adjustment during the installation of the air guiding device 9, measures for the automatic, correct positioning of the rear part 13 and for the fastening thereof are provided on the front part 12 of the air guiding device 9.

The front part 12 of the air guiding device 9 is integrated in an upper transverse strut 14 and in upper sections of lateral regions 15 of the tailgate 6. According to FIG. 7, the front part 12 of the air guiding device 9 is formed by an outer shell 16 oriented as an extension of the upper side 11 of the roof, a profiled, rear inner part 17 and an inner sheet 18 of the tailgate 6. The outer shell 16 of the front part 12, which outer shell drops rearward only slightly in relation to a horizontal plane and is slightly concave, and the inner sheet 18 of the upper transverse strut 14 are connected to each other in a front border region 19 at parallel flanges by flanging, adhesive bonding or the like and run approximately at an acute angle to each other. As FIG. 7 shows, a rear border region 20 of the outer shell 16 of the front part 12 is provided with a downwardly directed, step-shaped impression 21. The step-shaped impression 21 is adjoined by a downwardly protruding fastening flange 22 extending in the vertical direction. The fastening flange 22 extends virtually over the entire width of the tailgate 6.

The profiled inner part 17 is connected at one end to the inner side of the downwardly bent fastening flange 22 and at the other end to the inner sheet 18 of the upper transverse strut 14. The rear, profiled inner part 17 has a niche-shaped region 23 adjacent to its connection to the inner sheet 18, with the rear window 5 resting with the interposition of an adhesive element on a raised base section 24 of the niche-shaped region 23. The inner side of the rear window 5 is provided with an encircling print 25 around the border.

Figure 5:
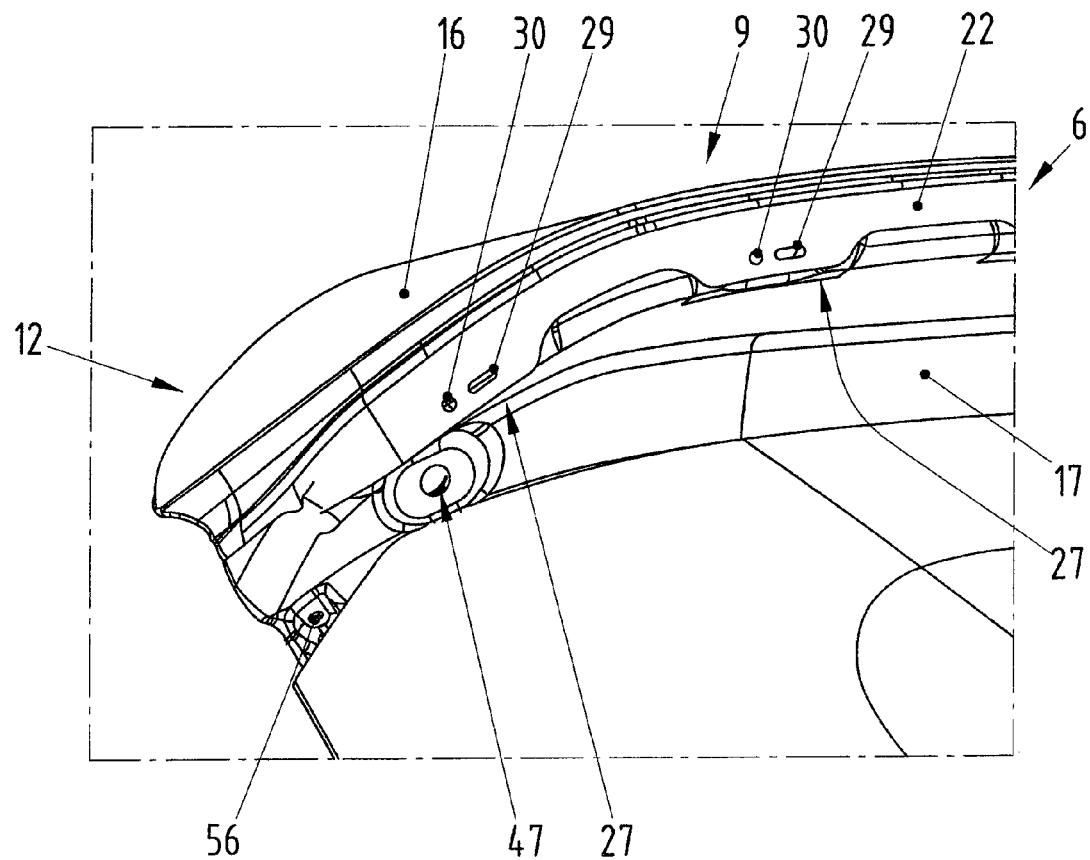
FIG. 5 is a diagrammatic, perspective view from the rear with a fastening flange of the front part.
Figure 9:
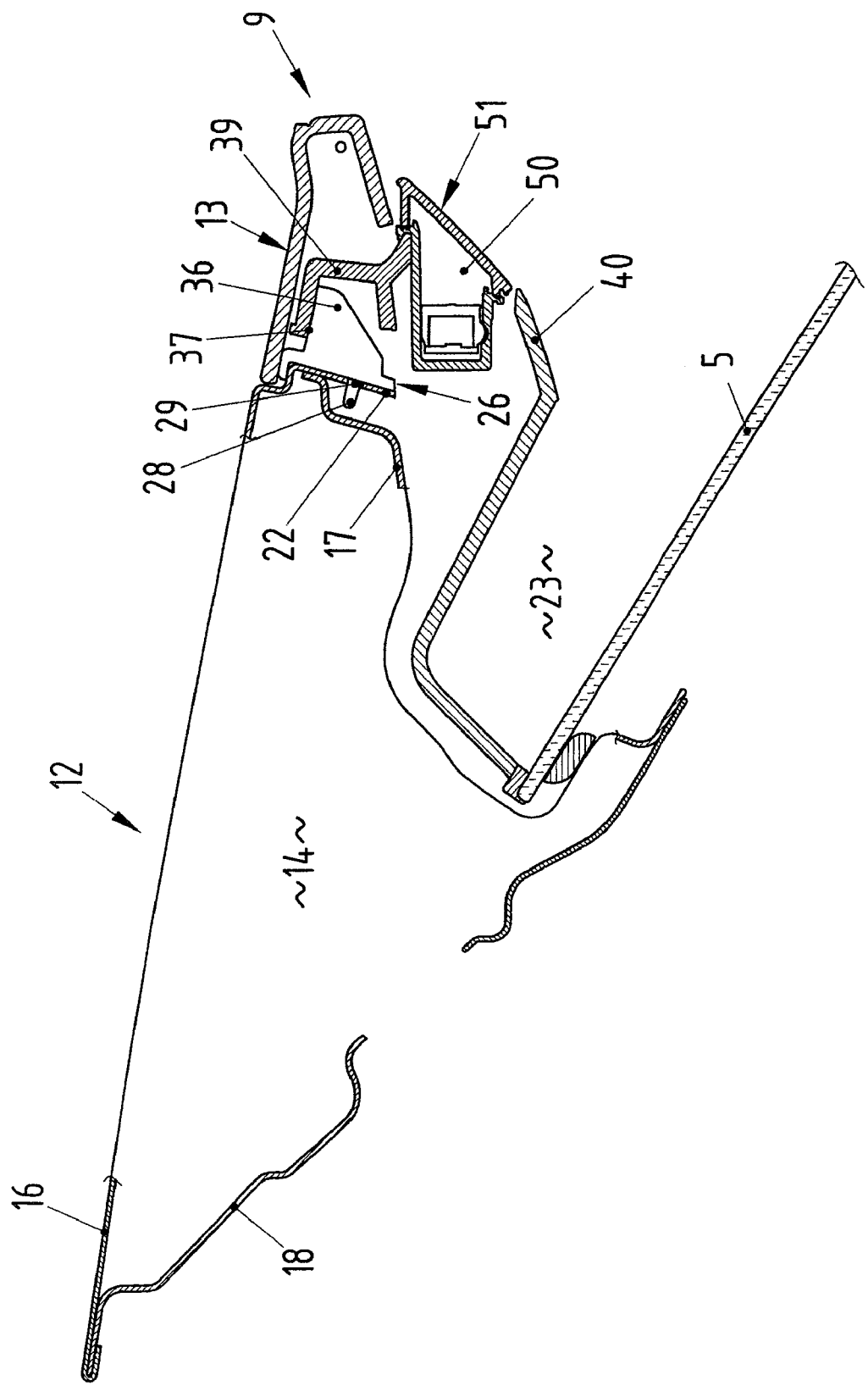
FIG. 9 is a diagrammatic, sectional view taken along the line IX-IX shown in FIG. 6 in an enlarged illustration.

A transversely running retaining strip 26 which serves for automatically correctly positioning and at the same time for fastening the rear part 13 of the air guiding device 9 is provided on the rear fastening flange 22 of the front part 12. The retaining strip 26, which is preferably produced from plastic, is positioned on the front part 12 of the air guiding device 9 by pins (contained on the strip) and is connected to the front part 12 via rivets or an adhesive connection. In fastening regions 27 of the retaining strip 26, the fastening flange 22 is drawn further downward than in the regions located inbetween (FIG. 5). Integrally formed, forwardly projecting peg sections 28 of the retaining strip 26 are guided through corresponding elongated holes 29 of the fastening flange 22, as a result of which the retaining strip 26 is fixed in the vertical direction of the vehicle (Z direction) (FIG. 9). Openings 30 for the riveted fastening of the retaining strip 26 are provided laterally next to the elongated holes 29 (FIG. 5).

Figure 6:
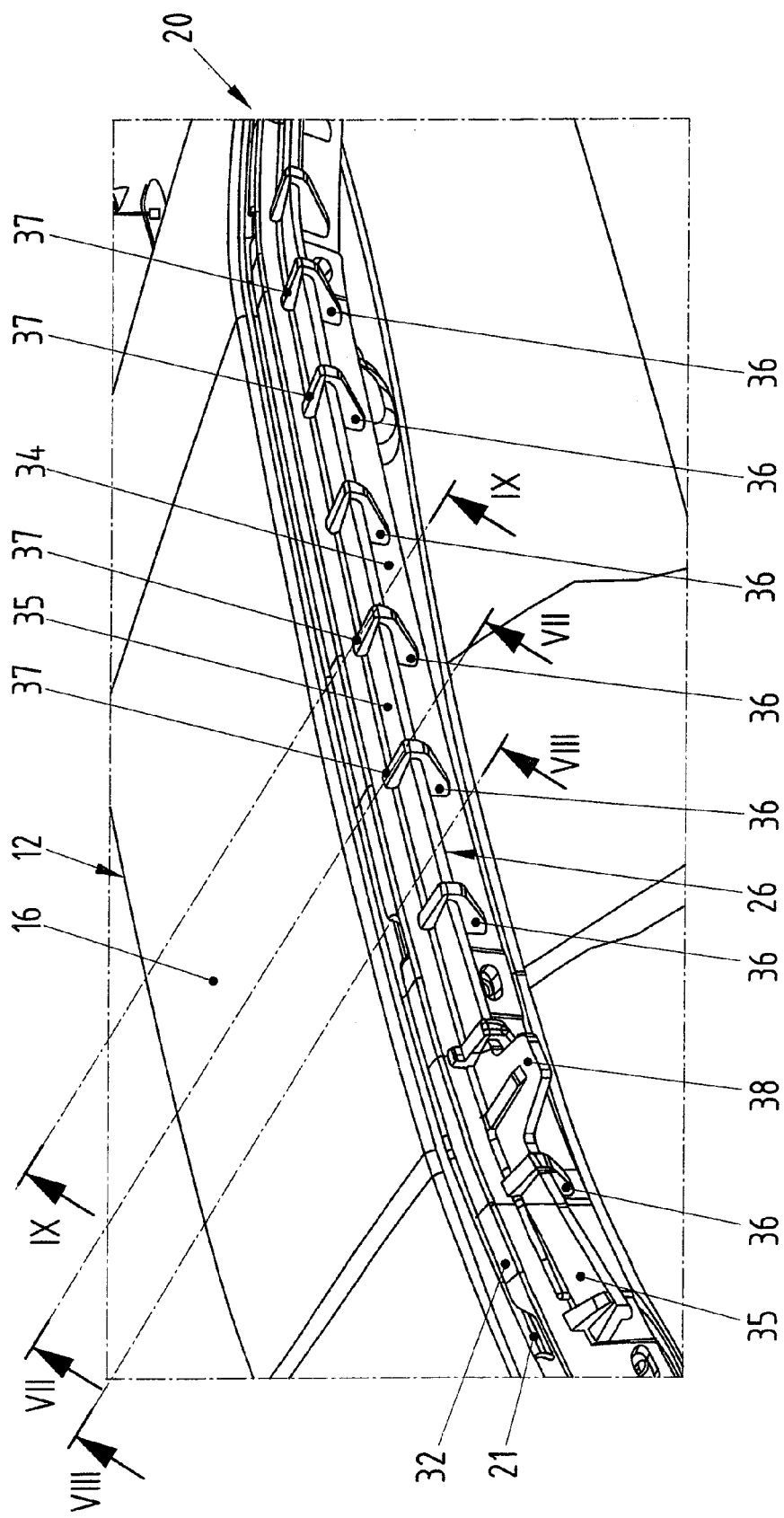
FIG. 6 is a diagrammatic, perspective view from the rear of the front part of the air guiding device and a retaining strip placed thereon.
Figure 8:
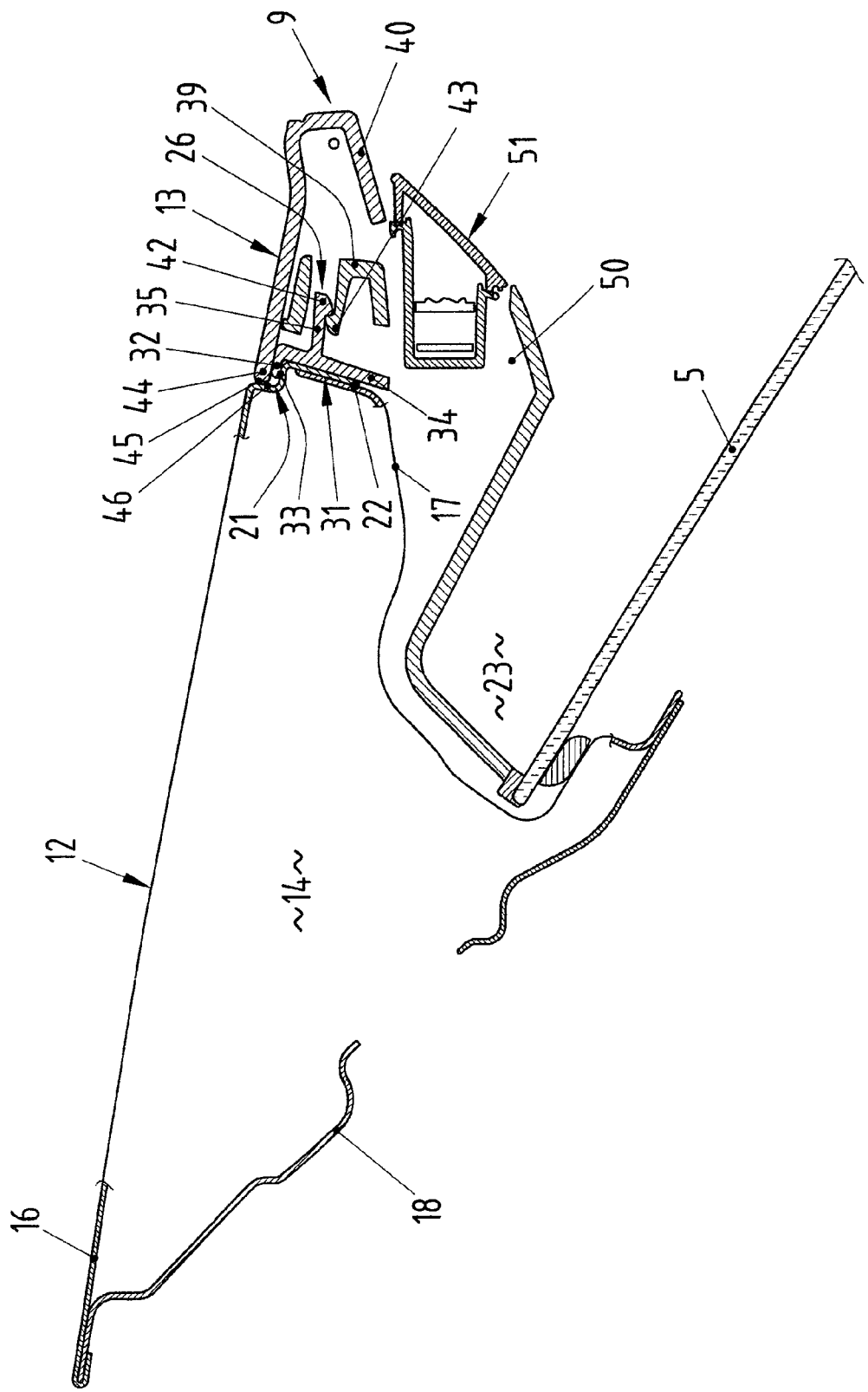
FIG. 8 is a diagrammatic, sectional view taken along the line VIII-VIII shown in FIG. 6 in an enlarged illustration.

The transversely running retaining strip 26 which extends over a substantial part of the width of the air guiding device 9 has, as seen in cross section (FIG. 8), a contact region 31 in the shape of an upside down L, the contact region 31 resting with its shorter limb 32 against the outer side of a base 33 of the step-shaped impression 21 and with its longer limb 34 on the outer side of the fastening flange 22 of the outer shell 16. A web 35 which is oriented approximately at a right angle to the longer limb 34 and protrudes rearward is guided away from the longer limb 34 of the contact region 31 of the retaining strip 26, the web, in the region of its transverse extent, being stiffened via a multiplicity of vertical supporting ribs 36 oriented in the longitudinal direction of the vehicle. The supporting ribs 36, which are relatively narrow as seen in the transverse direction, protrude slightly upward over the web 35 and, by their upper side, form contact surfaces 37 for the rear part 13 of the air guiding device 9. By the contact surfaces 37, the rear part 13 of the air guiding device 9 is positioned correctly in the Z direction (vertical direction of the vehicle). In laterally outer regions of the retaining strip 26, tongues 38 which are locally wedge-shaped are guided away to the rear from the rearwardly protruding web 35 and interact in a form-fitting manner with counterparts (not illustrated specifically) of the rear part 13 and, when the rear part 13 is pushed on, automatically correctly center the latter in the Y direction (transverse direction of the vehicle) (FIG. 6). As seen from the rear, the retaining strip 26 has a curved shape profile rather than a rectilinear one along its extent in the transverse direction.

Figure 10:
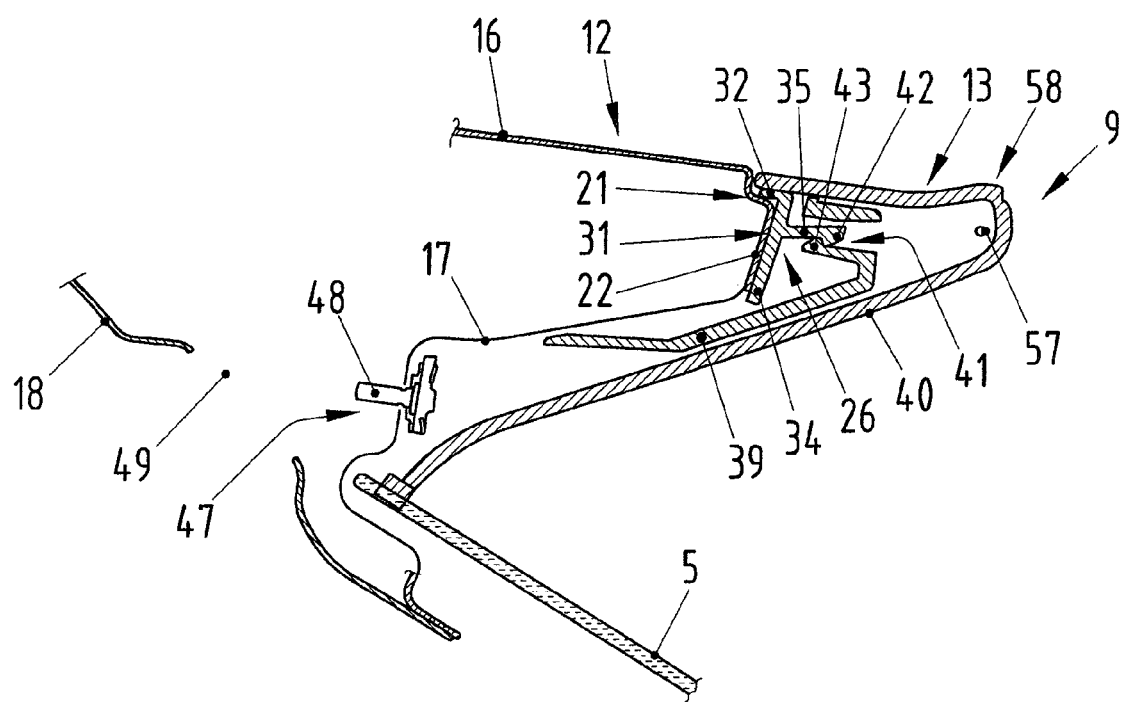
FIG. 10 is a diagrammatic, sectional view taken along the line X-X shown in FIG. 4 in an enlarged illustration.

The preferably plastic rear part 13 of the air guiding device 9 contains an inner support part 39 and an outer part 40 which is connected thereto, the two parts 39, 40 being connected to each other at parallel connecting regions by adhesive bonding or the like. The rear part 13 of the air guiding device 9 is pushed from the rear onto the retaining strip 26 of the front part 12, with latching 41 taking place in the X direction (longitudinal direction of the vehicle) between the two parts 12, 13. For the latching 41, latching lugs 42 which are molded on locally are provided at the free end of the rearwardly protruding web 35, to be precise on the lower side thereof, the latching webs interacting in an interlocking manner with latching lugs 43, which are located therebelow, of the inner support part 39 (FIG. 10). When the rear part 13 is fitted, a front, upper border region 44 of the outer part 40 rests on the upper side of the shorter limb 32 of the contact region 31 and is brought up to the upright wall section 46 of the step-shaped impression 21 of the outer shell 16 with a narrow gap 45 being formed. The rear part 13 is additionally connected releasably to the front part 12 at 47 via a plurality of screw connections. For this purpose, threaded bolts 48 are fitted locally on the inner support part 39 of the rear part 13. Fastening nuts (not shown specifically) are screwed from the inside or from the front onto the threaded bolts 48 through openings 49 in the front part 12. In a central region of its transverse extent, the rear part 13 has a rearwardly open receptacle 50 for a high-mounted brake light 51.

Figure 3:
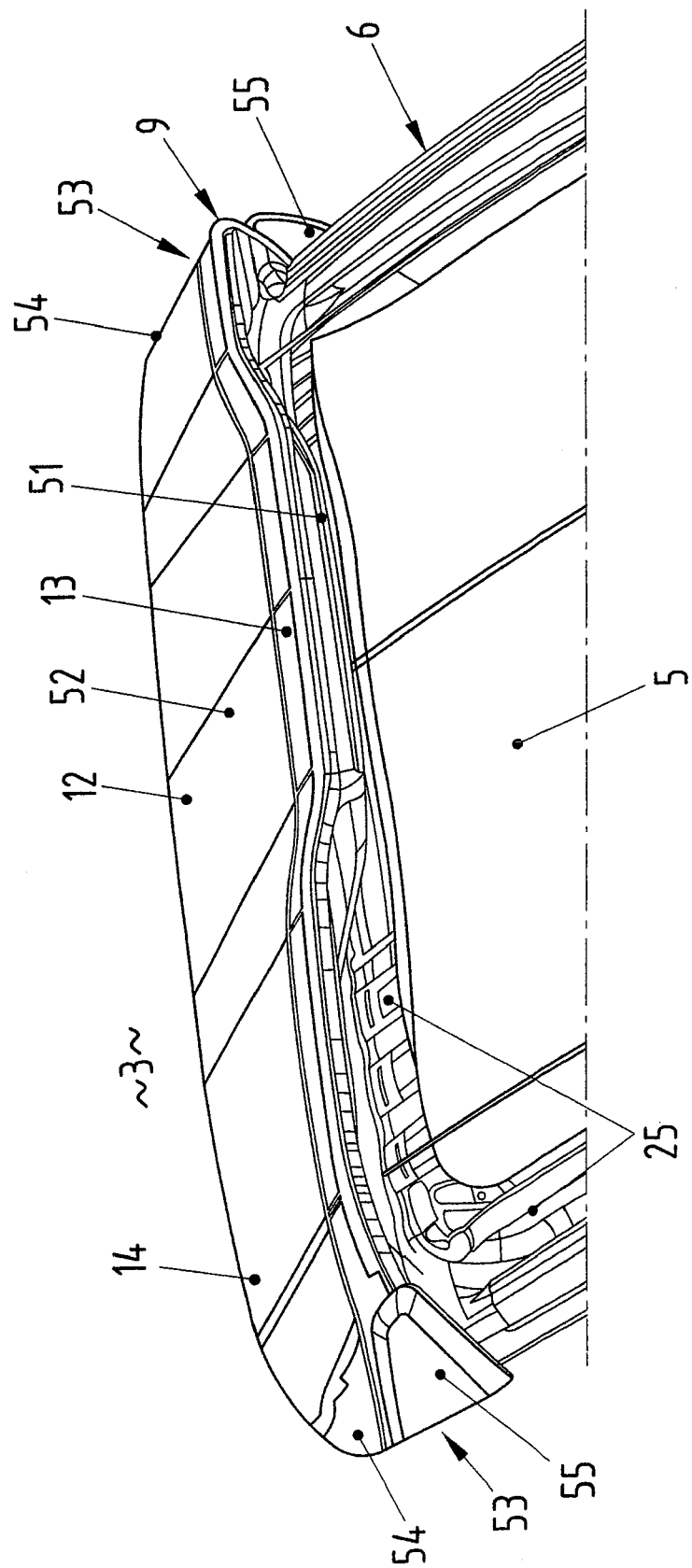
FIG. 3 is a diagrammatic, perspective view from the rear of the rear region of the motor vehicle with the air guiding device according to the invention and the tailgate located therebelow.
Figure 4:
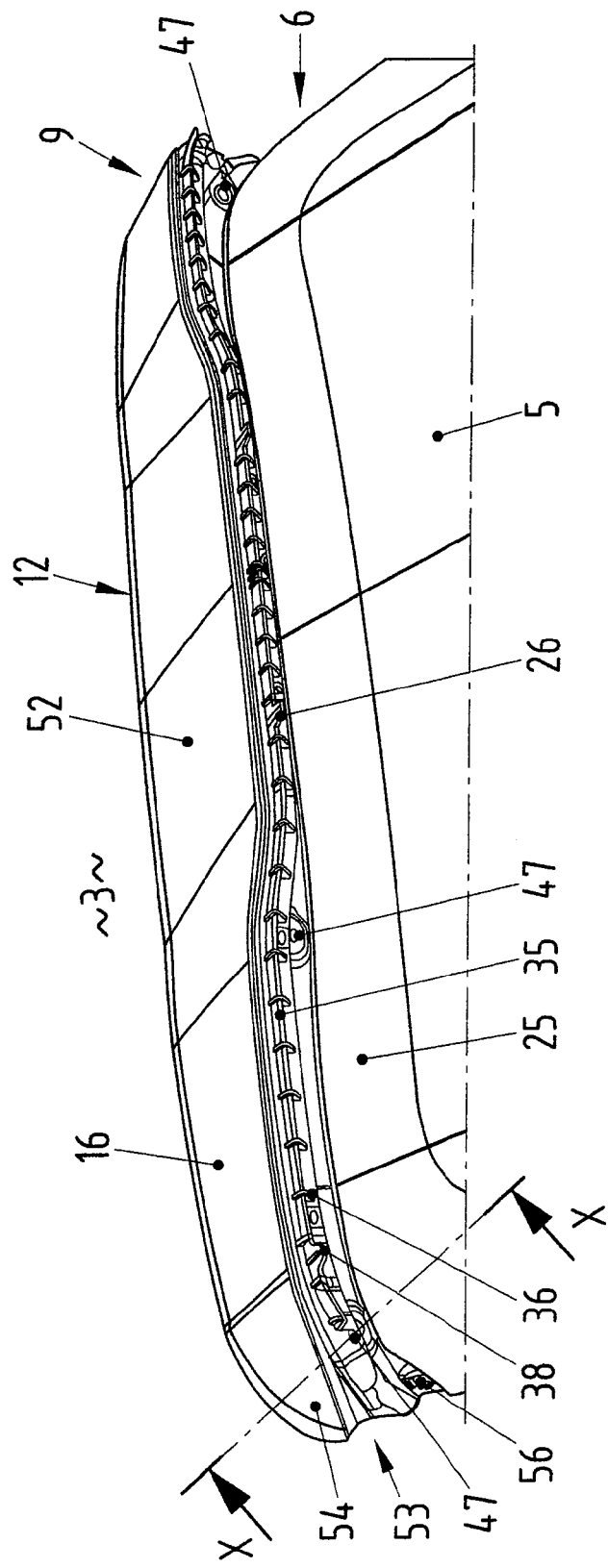
FIG. 4 is a diagrammatic, perspective view from the rear with a front part of the air guiding device.

In the exemplary embodiment, the front part 12 and the rear part 13 of the air guiding device 9 have—as seen in top view—a downwardly directed, channel-shaped indentation 52 in a central region of their transverse extent whereas outer regions are arranged such that they are slightly higher. Lateral outer end regions of the air guiding device 9 are formed by vertically oriented side cheeks 53 which extend in the longitudinal direction of the vehicle. Front sections 54 of the side cheeks 53 are assigned to the tailgate 6 whereas rear sections 55 of the side cheek 53 are formed integrally with the rear part 13 of the air guiding device 9. The rear sections 55 of the side cheeks 53 are screwed locally at 56 to the construction located therebelow (FIGS. 3 and 5).

An AM antenna 57 is integrated in the rear part 13 of the air guiding device 9. A transversely running separation edge 58 for the air flow flowing away over the roof 3 is formed in some regions of the rear, upper border of the rear part 13 of the air guiding device 9.

The invention claimed is:

1. A rear air guiding device for a motor vehicle, the air guiding device being disposed in a region of a roof rear edge on an upper border region of a tailgate provided with a rear window, the rear air guiding device comprising:
    a front part integrated in the tailgate and having an outer skin, said front part having an upper approach flow surface forming an extension of a roof upper side mounted in front of said upper approach flow surface, and said front part protruding over an upper border of the rear window; and
    a rear part adjoining said front part and having an outer skin flush with said outer skin of said front part, said rear part connected to said front part.

2. The rear air guiding device according to claim 1, wherein said rear part, as seen in a longitudinal direction of the motor vehicle, has a substantially shorter longitudinal extent than said front part.

3. The rear air guiding device according to claim 1, wherein said front part and said rear part are produced from different materials.

4. The rear air guiding device according to claim 1, wherein said front part and said rear part are designed to differ in color.

5. The rear air guiding device according to claim 1, further comprising means for an automatic correct positioning of said rear part and for a fastening of said rear part, said means disposed on a rear border of said front part.

6. The rear air guiding device according to claim 1, wherein said front part is integrated in an upper transverse strut and in lateral regions of the tailgate.

7. The rear air guiding device according to claim 6, wherein said front part includes an outer shell which extends the roof upper side, a profiled, rear inner part and an inner sheet of the upper transverse strut of the tailgate.

8. The rear air guiding device according to claim 7, wherein:
    said outer shell has a downwardly protruding fastening flange; and
    said outer shell of said front part and said inner sheet of the upper transverse strut are connected to each other in a front border region at parallel flanges and run at an acute angle to each other, and said profiled, rear inner part has a first end connected to said downwardly protruding fastening flange of said outer shell and a second end connected to a rear border region of said inner sheet of the upper transverse strut.

9. The rear air guiding device according to claim 7, wherein said profiled, rear inner part has a niche-shaped region adjacent to a connection to said inner sheet, with the rear window being fastened by means of an adhesive element to a base section of said niche-shaped region.

10. The rear air guiding device according to claim 1, wherein said front part is formed from aluminum sheets.

11. The rear air guiding device according to claim 8, wherein a rear border region of said outer shell of said front part has a step-shaped impression and an adjoining, downwardly protruding fastening flange.

12. The rear air guiding device asccording to claim 11, further comprising a transversely running, profiled retaining strip which serves for automatically correctly positioning said rear part and for fastening said rear part, said transversely running, profiled retaining strip is fastened to said downwardly protruding fastening flange of said front part.

13. The rear air guiding device according to claim 12, wherein:
    said step-shaped impression has a base; and
    said transversely running, profiled retaining strip has a contact region in a form of an upside down L, said contact region resting on said base of said step-shaped impression and on an outer side of said downwardly protruding fastening flange of said outer shell.

14. The rear air guiding device according to claim 13, wherein:
    said transversely running, profiled retaining strip has locally disposed supporting ribs oriented in a longitudinal direction of the motor vehicle; and
    said contact region has a longer limb, a shorter limb, and a rearwardly protruding web guided away from said longer limb, said rearwardly protruding web, in a region of said locally disposed supporting ribs, has upwardly protruding contact surfaces for said rear part.

15. The rear air guiding device according to claim 14, wherein said transversely running, profiled retaining strip has for a correct positioning of said rear part in a transverse direction of the motor vehicle, locally wedge-shaped tongues guided away to a rear from said rearwardly protruding web and interact in a form-fitting manner with said rear part.

16. The rear air guiding device according to claim 14, wherein said rear part is a plastic rear part and has an inner support part and an outer part which is connected to said inner support part.

17. The rear air guiding device according to claim 16, wherein said inner support part is connected to said outer part by adhesive bonding.

18. The rear air guiding device according to claim 16, wherein:
   said rearwardly protruding web having a free end with latching lugs;
   said inner supporting part having latching lugs; and
   said rear part is pushed onto said front part, latching takes place in a longitudinal direction of the motor vehicle between said front and rear parts, with said latching lugs at said free end of said rearwardly protruding web of said retaining strip interacting in a form-fitting manner with latching lugs of said inner supporting part.

19. The rear air guiding device according to claim 16, wherein a front, upper border region of said outer part of said rear part rests on said shorter limb of said contact region of said transversely running, profiled retaining strip and extends towards an upright wall section of said step-shaped impression with a narrow gap being formed between said front, upper border region of said outer part and said upright wall section.

20. The rear air guiding device according to claim 16,
   wherein said front part has openings formed therein;
   further comprising threaded bolts disposed locally on said inner support part of said rear part; and
   further comprising fastening nuts screwed onto said threaded bolts from an inside through said openings in said front part.

21. The rear air guiding device according to claim 16,
   wherein said rear part has a rearwardly open receptacle; and
   further comprising a high-mounted brake light inserted into said rearwardly open receptacle of said rear part.

* * * * *